(12) United States Patent
Zhou et al.

(10) Patent No.: US 9,982,423 B2
(45) Date of Patent: May 29, 2018

(54) WATER SAVING FLOW REGULATOR THAT IS FLOW VOLUME SWITCHABLE

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Huasong Zhou, Fujian (CN); Yongbin Cao, Fujian (CN); Xiangyang Hu, Fujian (CN); Jin'an Lin, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 132 days.

(21) Appl. No.: 15/103,136

(22) PCT Filed: Dec. 25, 2014

(86) PCT No.: PCT/CN2014/094898
§ 371 (c)(1),
(2) Date: Jun. 9, 2016

(87) PCT Pub. No.: WO2015/096759
PCT Pub. Date: Jul. 2, 2015

(65) Prior Publication Data
US 2016/0298321 A1    Oct. 13, 2016

(30) Foreign Application Priority Data

Dec. 26, 2013 (CN) .......................... 2013 1 0731765
Dec. 26, 2013 (CN) .................... 2013 2 0868791 U

(51) Int. Cl.
*G05D 7/01* (2006.01)
*E03C 1/084* (2006.01)
(Continued)

(52) U.S. Cl.
CPC ............ *E03C 1/084* (2013.01); *B05B 1/3013* (2013.01); *E03C 2001/026* (2013.01); *F16L 55/027* (2013.01); *Y02A 20/411* (2018.01)

(58) Field of Classification Search
CPC .... F16K 17/30; F16K 31/44; Y10T 137/7792; Y10T 137/7869; Y10T 137/7832; Y10T 137/7834; B05B 1/3073
(Continued)

(56) References Cited

U.S. PATENT DOCUMENTS 5,085,246 A * 2/1992 Griinke ................... F16K 17/30
                                                                  137/504
6,131,608 A * 10/2000 Lu ......................... F16K 31/385
                                                                  137/550
(Continued)

FOREIGN PATENT DOCUMENTS

CN         201351764 Y      11/2009
CN         201972201 U      9/2011
(Continued)

*Primary Examiner* — Patrick F Brinson
(74) *Attorney, Agent, or Firm* — Rabin & Berdo, P.C.

(57) ABSTRACT

A water-saving flow regulator includes a housing; a flow regulating device within the housing and having a shaft hole that has a periphery including a plurality of through holes; a switching shaft movable between an initial position and a second position, sleeved with a sealing part, and inserted into the shaft hole; and a water diversion body disposed above the flow regulating device and having a bottom portion that forms a chamber. When the switching shaft is in the initial position, the sealing part closes a first flow passage so that water only flows out of a second flow passage. When the switching shaft is in the second position, the sealing part of the switching shaft moves away from the flow regulating device, the second flow passage is open and remains open due to water pressure so that water flows out of both passages.

13 Claims, 3 Drawing Sheets

(51) Int. Cl.
*B05B 1/30* (2006.01)
*F16L 55/027* (2006.01)
*E03C 1/02* (2006.01)

(58) Field of Classification Search
USPC .............. 138/43, 45, 46; 137/504, 550, 230; 239/428.5, 570, 571, 575, 583; 251/339
See application file for complete search history.

(56) References Cited

U.S. PATENT DOCUMENTS

| | | | | |
|---|---|---|---|---|
| 7,143,997 | B2* | 12/2006 | Kao | E03C 1/04 |
| | | | | 251/339 |
| 7,219,690 | B2* | 5/2007 | McDonald | F16K 17/30 |
| | | | | 137/512.1 |
| 7,677,473 | B2 | 3/2010 | Kao | |
| 7,950,624 | B2* | 5/2011 | Liao | E03C 1/08 |
| | | | | 222/509 |
| 8,402,995 | B2* | 3/2013 | Zoller | G05D 7/012 |
| | | | | 137/454.2 |
| 9,222,599 | B2* | 12/2015 | Kao | F16K 47/023 |
| 9,410,635 | B2* | 8/2016 | Akimoto | G05D 7/0133 |
| 2013/0068860 | A1* | 3/2013 | Tempel | B05B 1/3033 |
| | | | | 239/428.5 |
| 2016/0090945 | A1* | 3/2016 | Onodera | F02M 25/0836 |
| | | | | 137/516.13 |
| 2016/0319527 | A1* | 11/2016 | Tempel | B05B 1/3033 |

FOREIGN PATENT DOCUMENTS

| | | |
|---|---|---|
| CN | 102359154 A | 2/2012 |
| CN | 103696462 A | 4/2014 |
| CN | 203625983 U | 6/2014 |
| DE | 202006003342 U1 | 7/2007 |

\* cited by examiner

US 9,982,423 B2

WATER SAVING FLOW REGULATOR THAT IS FLOW VOLUME SWITCHABLE

FIELD OF THE INVENTION

The present invention relates to sanitary ware and water supplying field, especially to a water-saving flow regulator with flow volume switchable.

BACKGROUND OF THE INVENTION

Flow regulators are widely used in the sanitary wares and washing device as sanitary accessory. A flow regulator is used to regulate the water flowing to diffuse the water flowing to particles and to absorb air to mix with water to form washing water with a lot of bubbles. This kind of accessory has varies types that can be assembled to taps, shower heads, etc.

The flow regulator can be used with a water-saving device to be made with water-saving function. However, this kind of flow regulator has only one working state, the water-saving state, it can not achieve high flow volume, which is limited in the applicability.

SUMMARY OF THE INVENTION

The present invention is provided with a water-saving flow regulator with flow volume switchable to solve above mentioned technical problems.

The technical proposal of the present invention is that:

A water-saving flow regulator with flow volume switchable, comprising a housing and flow regulating device disposed in the housing, wherein further comprising a switch shaft and a water diversion body disposed above the flow regulating device, the switch shaft is sleeved with a sealing part, the flow regulating device is disposed with a shaft hole, the switch shaft is inserted in the shaft hole, a first flowing passage is formed between the switch shaft and the shaft hole wall of the flow regulating device; the periphery of the shaft hole is disposed with a plurality of through holes, the through holes form a second flowing passage, the bottom portion of the water diversion body forms a chamber, the switch shaft is movable between an initial position and a second position;

in the initial position, the sealing part of the switch valve closes the first flowing passage of the flow regulating device, water only flows out of the second flowing passage;

in the second position, the sealing part of the switch valve leaves away from the flow regulating device, the second flowing passage is open and keeps open under the water pressure, water flows out of the first flowing passage and the second flowing passage.

In another preferred embodiment, the switch shaft is disposed with a big end, the big end is sleeved on the sealing part.

In another preferred embodiment, the center of the water diversion body is disposed with a hollow protruding, a plurality of water diversion holes are disposed at the edge of the protruding; the internal portion of the protruding is disposed with an accommodating chamber with an downward opening, the sealing part of the switch shaft closes the accommodating chamber when entering the accommodating chamber.

In another preferred embodiment, the flow regulating device comprises an inlet body and a rectifier, the inlet body is disposed at the inlet port, the rectifier is disposed below the inlet body.

In another preferred embodiment, the inlet body comprises a periphery wall, the bottom portion of the internal portion of the periphery wall is disposed with a baffle, a plurality of throughout holes are disposed at the baffle, the center of the baffle is disposed with a first shaft hole, the side of the first shaft hole facing to the water diversion body is disposed with a step hole with diameter enlarged.

In another preferred embodiment, the rectifier is plate shaped with a plurality of concentric annular rings, a plurality of radial short columns are disposed between the annular rings, a water hole is formed between two adjacent short columns; the center of the rectifier is disposed with a second shaft hole to hold the switch shaft.

In another preferred embodiment, the switch shaft is column shaped, the upper end of the switch shaft is disposed with two protrudings surrounding the periphery wall, an annular groove is formed between the two protrudings, the sealing part is a sealing ring assembled to the annular groove.

In another preferred embodiment, the flow regulating device further comprises a flat filter assembled to the outlet portion of the flow regulating device, the center of the flat filter is disposed with a third shaft hole to hold the switch shaft.

In another preferred embodiment, the flow regulator further comprises a switch shaft reset device, the switch shaft reset device comprises a spring, one end of the spring abuts against the switch shaft, the other end abuts against the bottom portion of the water diversion body.

In another preferred embodiment, the axis of the end portion of the switch shaft is disposed with a spring position chamber, the accommodating chamber of the bottom portion of the water diversion body is disposed with a position column inserted to the spring position chamber; one end of the spring is disposed in the spring position chamber of the switch shaft, the other end abuts against the position column of the water diversion body.

In another preferred embodiment, the lower edge of the protruding of the water diversion body forms a hem, the water diversion holes are disposed at the connecting of the hem and the protruding, a reinforcing rib is disposed between two adjacent water diversion holes; the top portion of the protruding is an arc section.

In another preferred embodiment, the flow regulating device comprises an inlet body and a rectifier; the inlet body comprises a periphery wall, the bottom portion of the internal portion of the periphery wall is disposed with a baffle, the baffle is disposed with a plurality of throughout holes; a position step and an assembly groove is disposed in the periphery wall of the inlet body above the baffle.

In another preferred embodiment, the flow regulating device further comprises a filter and a flat filter; the flat filter, the rectifier and the inlet body are assembled in the housing in order; the switch shaft is disposed in the inlet body, the lower portion of the switch shaft passes through the inlet body, the rectifier, the flat filter and the housing in order; the water diversion body is assembled to the position step of the inlet body, the filter is assembled above the water diversion body, the assembly ring of the filter is embedded to the assembly groove of the inlet body; an inlet chamber is formed between the internal wall of the filter and the external periphery surface of the water diversion body; an outlet chamber is formed between the lower surface of the hem of the water diversion body and the upper surface of the baffle of the inlet body.

As can be seen from above, the present invention is provided with a water-saving flow regulator with flow volume switchable, which has two working states. Normally is the water-saving state, the first flowing passage of the flow regulating device is closed by the switch shaft, water flows out of the second flowing passage. The water-saving state is suitable when low flow volume is required.

When high flow volume is required, pushing the switch shaft up, the first flowing passage is open, water flows out of the first and second flowing passage, at this time, it is in high outlet volume that it can achieve high flow volume. The present invention is further disposed with a reset device. When in high volume state, with the water pressure pushing upwardly, the switch shaft overcomes the action of the reset device to abut against the water diversion body, the switch shaft would not drop down. When the tap is turned off, the switch shaft is pushed down by the action of the reset device to return to initial state, at this time, water flows out of only one flowing passage that it achieves forcible water-saving.

The present invention has less component and smaller size, it can achieve free switch between two outlet states.

REFERENCE SIGNS

Figure 1:
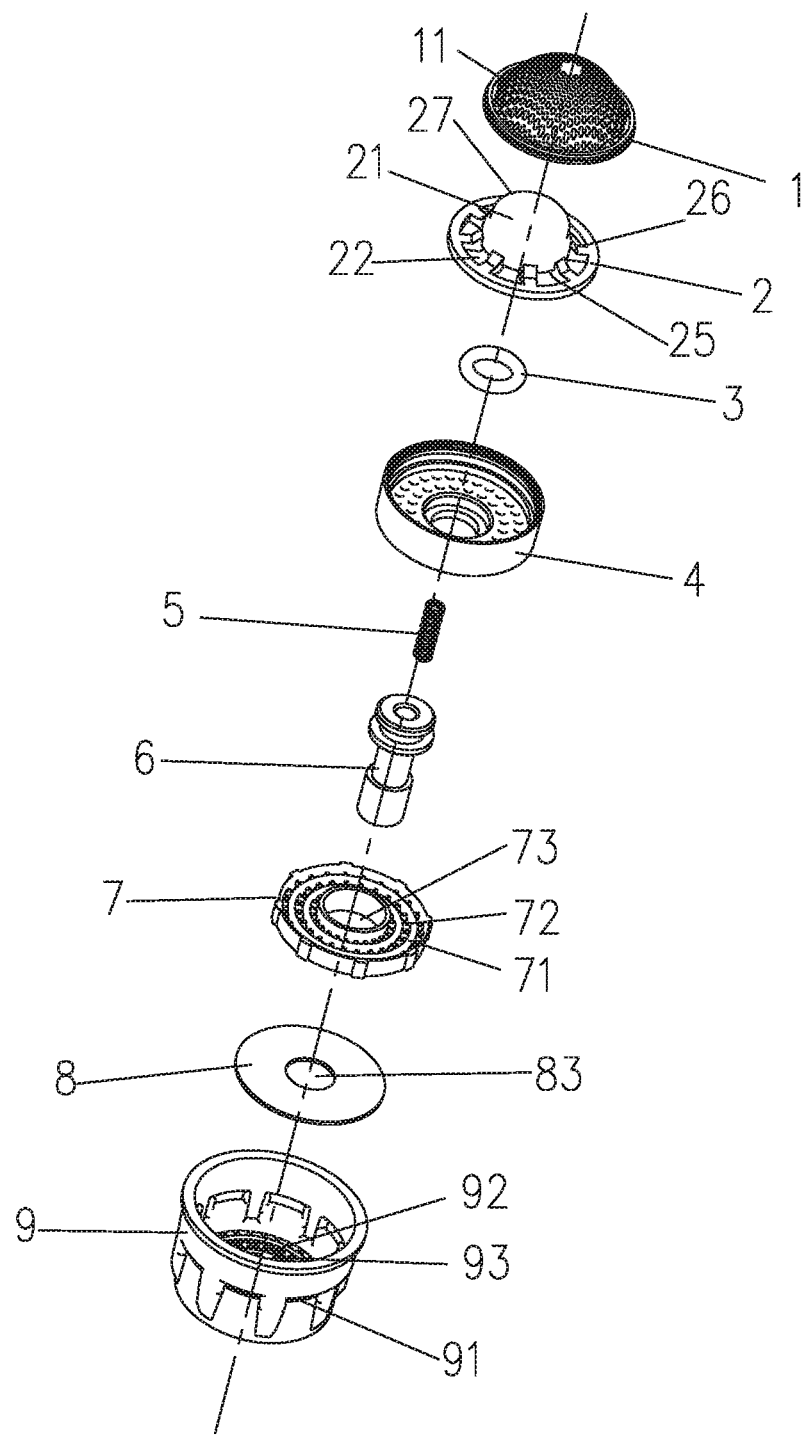
FIG. 1 illustrates an exploded and schematic diagram of the present invention.

Filter 1, through hole 11, assembly ring 12
Water diversion body 2, protruding 21, water diversion hole 22, accommodating chamber 23, position column 24, hem 25
Reinforcing rib 25, arc section 27
O-ring 3
Inlet body 4, periphery wall 41, baffle 42, throughout hole 43, first shaft hole 44, step hole 45, position step 46, assembly groove 47
Spring 5
Switch shaft 6, flange 61, 62, insert hole 64, central portion 65, lower portion 66
Rectifier 7, concentric annular ring 71, short column 72, second shaft hole 73
Flat filter 8, third shaft hole 83
Housing 9, suction hole 91, outlet 92, fourth shaft hole 93

DETAILED DESCRIPTION OF THE EMBODIMENTS

Figure 2:
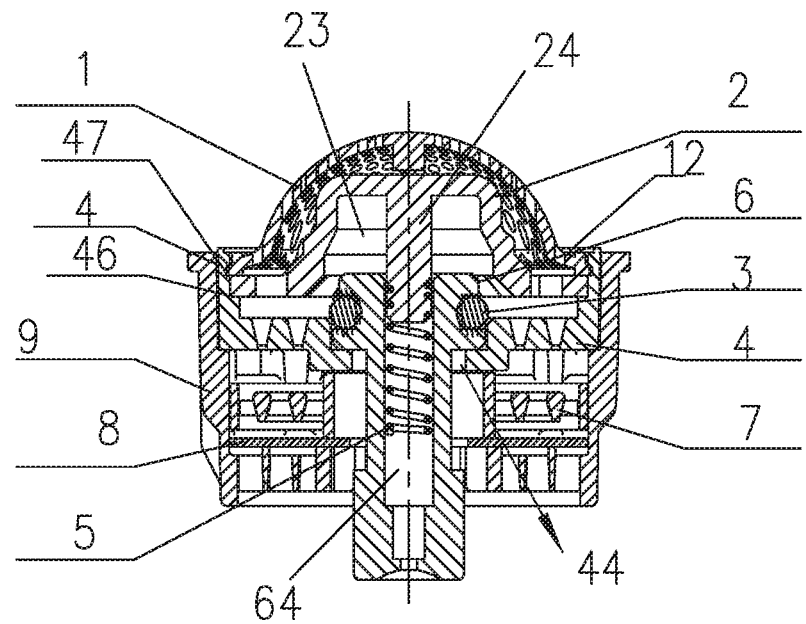
FIG. 2 illustrates a sectional diagram of the present invention in water-saving state.
Figure 3:
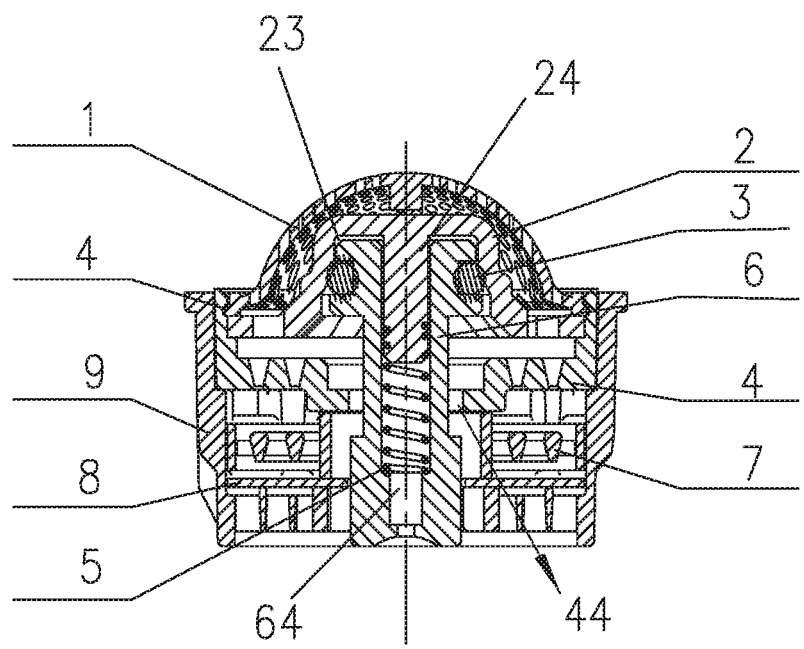
FIG. 3 illustrates a sectional diagram of the present invention in high volume state.

Referring to FIGS. 1-3, a water-saving flow regulator with flow volume switchable of an detailed embodiment of the present invention comprises a filter 1, a water diversion body 2, an inlet body 4, a switch shaft 6, a rectifier 7 and a housing 9.

The filter 1 is a semi-spherical shape with a plurality of throughout holes 11 used to diffuse the water flowing, the lower edge of the filter 1 is disposed with an assembly ring 12.

The center of the water diversion body 2 is disposed with a column shaped protruding 21, a plurality of water diversion holes 22 are disposed at the lower edge of the protruding 21. The internal portion of the protruding 21 is disposed with an accommodating chamber 23 with a downward opening, the axis of the accommodating chamber is disposed with a downward position column 24. The lower edge of the column protruding 21 forms with a hem 25, the water diversion holes 22 are disposed at the connecting of the hem 25 and the protruding 21, a reinforcing rib 26 is disposed between two adjacent water diversion holes 22, the top portion of the column protruding 21 is an arc section 27 (as figured in FIG. 1, FIG. 2, FIG. 3).

Figure 4:
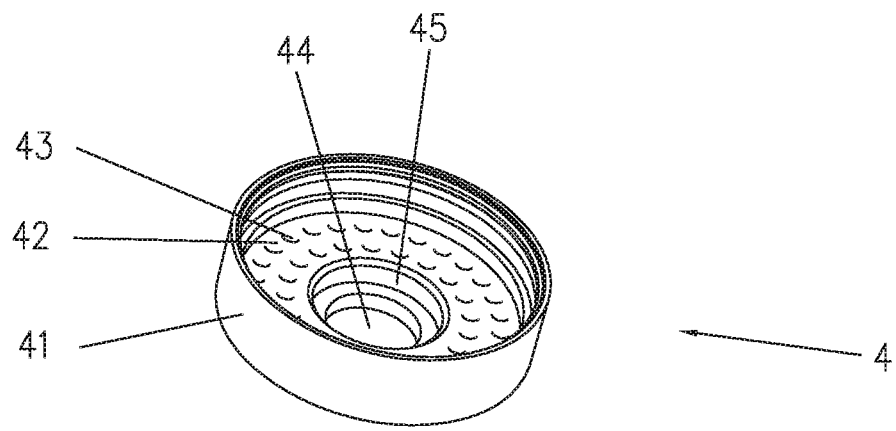
FIG. 4 illustrates a schematic diagram of the inlet body.

Referring to FIG. 4, the inlet body comprises a periphery wall 41, the bottom portion of the internal portion of the periphery wall is disposed with a baffle 42, a plurality of throughout holes 43 are disposed at the baffle 42. The center of the baffle 42 is disposed with a first shaft hole 44, the side of the first shaft hole 44 facing to the water diversion body is disposed with a step hole 45 with diameter enlarged. A position step 46 and an assembly groove 47 are disposed above the baffle 42 of the periphery wall 41 in order.

Figure 5:
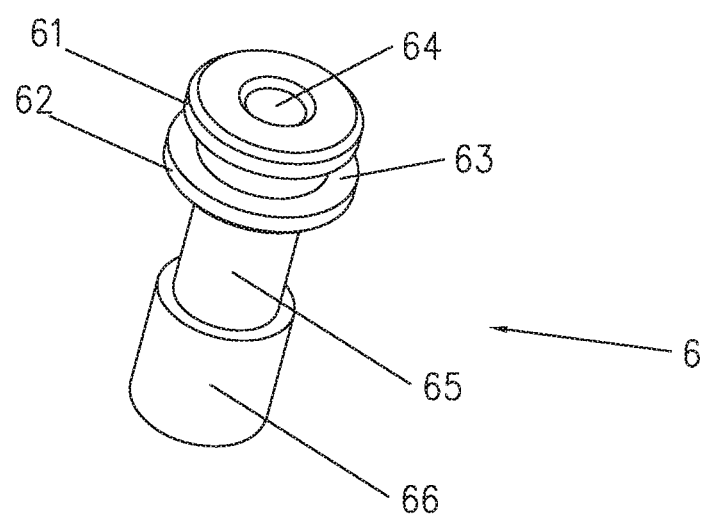
FIG. 5 illustrates a schematic diagram of the switch shaft.

Referring to FIG. 5, the switch shaft 6 is column shaped with large two ends and small center, the diameter of the central portion 65 is smaller than the diameter of the shaft hole 44 of the baffle 42, a flowing passage is formed between the center and the shaft hole 44. The upper end of the switch shaft 6 is disposed with two flanges 61, 62 surrounding the periphery wall, the diameter of the flange 61 is larger than the diameter of the shaft hole 44 and is smaller than the diameter of the step hole 45, so that the flange 61 can be inserted to the step hole 45 to close the flowing passage between the central portion 65 of the switch shaft 6 and the shaft hole 44. An annular groove 63 is formed between the two flanges, when assembling, the sealing ring 3 is locked to the annular groove 63 and is contacted with the internal wall of the step hole 45 to fully close the flowing passage. The switch shaft 6 is further disposed with an insert hole 64 with upward opening, the spring 5 is positioned in the insert hole 64.

The rectifier 7 is plate shaped with a plurality of concentric annular rings 71, a plurality of radial short columns 72 are disposed between the annular rings, a water hole is formed between two adjacent short columns. The center of the rectifier is disposed with a second shaft hole to hole the switch shaft 6.

The center of the flat filter 8 is disposed with a third shaft hole 83 to hold the switch shaft 6.

The periphery wall of the housing 9 is disposed with a plurality of suction holes 91 with space, the center of the bottom plate at the internal portion of the housing is disposed with a fourth shaft hole 93 to hold the switch shaft 6. The bottom plate at the periphery of the fourth shaft hole 93 is disposed with an outlet 92.

The flat filter 8, the rectifier 7 and the inlet body 4 of the present invention are assembled in the housing 9 in order; the switch shaft 6 is assembled in the inlet body 4, the lower portion 66 of the switch shaft 6 passes through the first shaft hole 44, the second shaft hole 73 of the rectifier, the third shaft hole 83 of the flat filter and the fourth shaft hole 93 of the housing in order; the water diversion body 2 is assembled to the position step 46 of the inlet body 4, the filter 1 is assembled above the water diversion body 2, the assembly ring 12 is embedded to the assembly groove 47 of the inlet body 4. An inlet chamber is formed between the internal wall of the filter 1 and the external periphery surface of the water diversion body 2; an outlet chamber is formed between the lower surface of the hem 25 of the water diversion body and the top surface of the baffle 42 of the inlet body. As the top portion of the column protruding 21 is disposed with an arc section that it makes water flowing smoothly, the reinforcing ribs 26 disposed incline guarantee the strength of the water diversion body 2 and smoothly water flowing.

The usage of the present invention is that: normally is the water-saving state, the flange 61 of the switch shaft 6 is inserted to the step hole 45 to close the flowing passage between the central portion 65 of the switch shaft and the shaft hole 44, the sealing ring 3 is disposed at the internal wall of the step hole 45 of the inlet body 4 for further sealing, to stop water flowing through the first shaft hole 44. The water from the filter 1 to the flow regulator flows through the water diversion hole 22 of the water diversion body 2 to flow downwardly to the throughout holes 43 of the inlet body 4, and then water is rectified by the rectifier 7 to mix with air to generate bubble water. Water flows out of the outlet at the bottom of the housing 9 after the buffering of the flat filter 8.

When high volume is required, the switch shaft 6 is pushed upwardly until the sealing ring 3 abuts against the internal wall of the protruding 21 of the water diversion body 2. Except the outlet route same as in the water-saving state, water flows downwardly from chamber between the switch shaft 6 and the internal wall of the first shaft hole 44 of the inlet body 4 and then flows out through the second shaft hole 73 of the rectifier 7, the third shaft hole 83 of the filter 8 and the fourth shaft hole 93 of the housing. As an outlet passage is added, it flows out in high volume that it can satisfy the need of washing vegetables.

When in high volume state, with the water pressure pushing upwardly, the switch shaft 6 overcomes the action of the spring 5 to abut against the internal wall of the protruding 21 of the water diversion body 2, the switch shaft would not drop down. When the tap is turned off, the water pressure reduces, the switch shaft 6 is pushed down by the action of the spring 5 to return to initial state, at this time, water flows out of only one flowing passage that it achieves forcible water-saving.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a water-saving flow regulator with flow volume switchable, when in the initial position, the sealing part of the switch shaft closes the first flowing passage of the flow regulating device, water flows out of the second flowing passage; when in a second position, the sealing part of the switch shaft leaves away from the flow regulating device, the second flowing passage is open and keeps open state under the water pressure, water flows out of the first and second flowing passage, the present invention can be freely switched in two outlet states that it has well industrial applicability.

The invention claimed is:
1. A water-saving flow regulator that is flow volume switchable, comprising:
   a housing;
   a flow regulating device that is disposed in the housing, that has an inlet port, and that has defined therein a shaft hole having a peripheral wall in which is defined a plurality of through holes;
   a switching shaft that is movable between an initial position and a second position, that is sleeved with a sealing part, and that is inserted into the shaft hole so that a first passage is formed between the switching shaft and the peripheral wall of the shaft hole of the flow regulating device and a second flow passage is formed by the plurality of through holes provided in the peripheral wall of the shaft hole; and
   a water diversion body that is disposed above the flow regulating device and that has a bottom portion which forms a chamber,
   wherein, when the switching shaft is in the initial position, the sealing part of the switching shaft closes the first flow passage of the flow regulating device so that water only flows out of the second flow passage, and
   wherein, when the switching shaft is in the second position, the sealing part of the switching shaft moves away from the flow regulating device, the second flow passage is open and remains open due to water pressure so that water flows out of the first flow passage and the second flow passage.

2. The water-saving flow regulator according to claim 1, wherein the switching shaft has one end that is larger than another end and the one end is sleeved with the sealing part.

3. The water-saving flow regulator according to claim 1, wherein the water diversion body has a center portion disposed with a protrusion that is hollow, a plurality of water diversion holes defined at an edge thereof, and an internal portion disposed with an accommodating chamber with a downward opening, and wherein the sealing part of the switching shaft closes the accommodating chamber when the switching shaft enters the accommodating chamber.

4. The water-saving flow regulator according to claim 1, wherein the flow regulating device comprises an inlet body disposed at the inlet port; and a rectifier disposed below the inlet body.

5. The water-saving flow regulator according to claim 4, wherein the inlet body comprises a peripheral wall having a bottom portion disposed with a baffle, and wherein the baffle has defined therein a plurality of through holes, and the baffle has a center in which is defined a first shaft hole that has a side facing the water diversion body in which is defined a step hole having a diameter that is enlarged.

6. The water-saving flow regulator according to claim 4, wherein the rectifier has a shape of a plate having a plurality of concentric annular rings that have a plurality of radial short columns disposed therebetween so that a water hole is formed between two adjacent short columns, and wherein the rectifier has a center portion in which is defined a second shaft hole in which the switching shaft is disposed.

7. The water-saving flow regulator according to claim 1, wherein the switching shaft has a shape of a column having a peripheral wall and an upper end provided with two protrusions surrounding the peripheral wall, and an annular groove defined between the two protrusions, and wherein the sealing part is a sealing ring seated within the annular groove.

8. The water-saving flow regulator according to claim 1, wherein the flow regulating device has an outlet portion and further comprises a flat filter assembled at the outlet portion and having a center in which is defined a third shaft hole within which the switching shaft is disposed.

9. The water-saving flow regulator according to claim 1, wherein the flow regulator further comprises a switching shaft reset device comprising a spring having one end that abuts against the switching shaft and another end that abuts against the bottom portion of the water diversion body.

10. The water-saving flow regulator according to claim 9, wherein the switching shaft reset device has an end portion having an axis and having disposed thereon a spring positioning chamber that accommodates the spring, wherein the water diversion body has an accommodating chamber having a positioning column that is inserted into the spring position chamber so that one end of the spring is disposed in the spring positioning chamber and another end abuts against the positioning column of the water diversion body.

11. The water-saving flow regulator according to claim 3, wherein the protrusion of the water diversion body has a lower edge that forms a hem, wherein the plurality of water diversion holes are disposed where the hem and the protrusion meet, wherein a reinforcing rib is disposed between two adjacent water diversion holes, and wherein the protrusion has a top portion shaped as an arc section.

12. The water-saving flow regulator according to claim 11, wherein the flow regulating device comprises an inlet body having a peripheral wall that has an internal portion with a bottom portion of the internal portion that is provided with a baffle in which are defined a plurality of throughout holes, and wherein the peripheral wall of the inlet body above the baffle is provided with a positioning step and an assembly groove.

13. The water-saving flow regulator according to claim 12, wherein the flow regulating device further comprises a filter; and a flat filter, wherein the flat filter, the rectifier and the inlet body are assembled in the housing in that order, wherein the switching shaft is disposed in the inlet body and has a lower portion that passes through the inlet body, the rectifier, the flat filter and the housing in that order, wherein the water diversion body is assembled to the positioning step of the inlet body, the filter has an assembly ring and is assembled above the water diversion body, the assembly ring of the filter is embedded within the assembly groove of the inlet body, and an inlet chamber is formed between an internal wall of the filter and an external peripheral surface of the water diversion body, and wherein an outlet chamber is formed between a lower surface of the hem of the water diversion body and an upper surface of the baffle of the inlet body.

\* \* \* \* \*